(12) United States Patent
Kardatzke

(10) Patent No.: US 9,100,710 B2
(45) Date of Patent: *Aug. 4, 2015

(54) METHODS, SYSTEMS, AND MEDIA FOR PROVIDING MEDIA GUIDANCE WITH MEDIA CONTENT FROM ALTERNATE SOURCES

(71) Applicant: Google Inc., Mountain View, CA (US)

(72) Inventor: Jeffrey Arthur Kardatzke, Redondo Beach, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,275

(22) Filed: Feb. 19, 2014

(65) Prior Publication Data

US 2014/0208360 A1 Jul. 24, 2014

Related U.S. Application Data

(63) Continuation of application No. 13/648,083, filed on Oct. 9, 2012, now Pat. No. 8,661,472.

(51) Int. Cl.
*H04N 5/445* (2011.01)
*H04N 21/482* (2011.01)
*H04N 21/462* (2011.01)

(52) U.S. Cl.
CPC ......... *H04N 21/482* (2013.01); *H04N 21/4622* (2013.01); *H04N 21/4821* (2013.01)

(58) Field of Classification Search
USPC .................................................. 725/48, 49
See application file for complete search history.

(56) References Cited

U.S. PATENT DOCUMENTS

| 6,341,374 | B2 | 1/2002 | Schein et al. |
|---|---|---|---|
| 6,412,110 | B1 | 6/2002 | Schein et al. |
| 7,240,356 | B2 | 7/2007 | Iki et al. |
| 2007/0055993 | A1 | 3/2007 | Braun et al. |
| 2008/0244671 | A1 | 10/2008 | Moon et al. |
| 2010/0205628 | A1 | 8/2010 | Davis et al. |
| 2011/0125774 | A1 | 5/2011 | Dow et al. |
| 2011/0126226 | A1 | 5/2011 | Makhlouf |
| 2011/0126234 | A1 | 5/2011 | Makhlouf |

OTHER PUBLICATIONS

Office Action dated Feb. 7, 2013 in U.S. Appl. No. 13/648,083.

*Primary Examiner* — Fernando Alcon
(74) *Attorney, Agent, or Firm* — Byrne Poh LLP

(57) ABSTRACT

In accordance with some embodiments of the disclosed subject matter, mechanisms for providing media guidance with media content from alternate sources are provided. In some embodiments, a method for providing media guidance with a plurality of media sources is provided, the method comprising: storing a plurality of media content listings corresponding to a plurality of media content items, wherein each of the plurality of media content items is provided by a content source; determining a subset of the plurality of media content listings for presenting to a user; determining, for each media content listing in the subset of the plurality of media content listings, whether an alternate source for providing a media content item corresponding to a media content listing is available, wherein the alternate source is different from the content source; and causing a subset of the plurality of media content listings to be presented to the user, wherein a selectable alternate source indicator is presented within the corresponding media content listing in response to determining that the media content item is available from the alternate source.

21 Claims, 12 Drawing Sheets

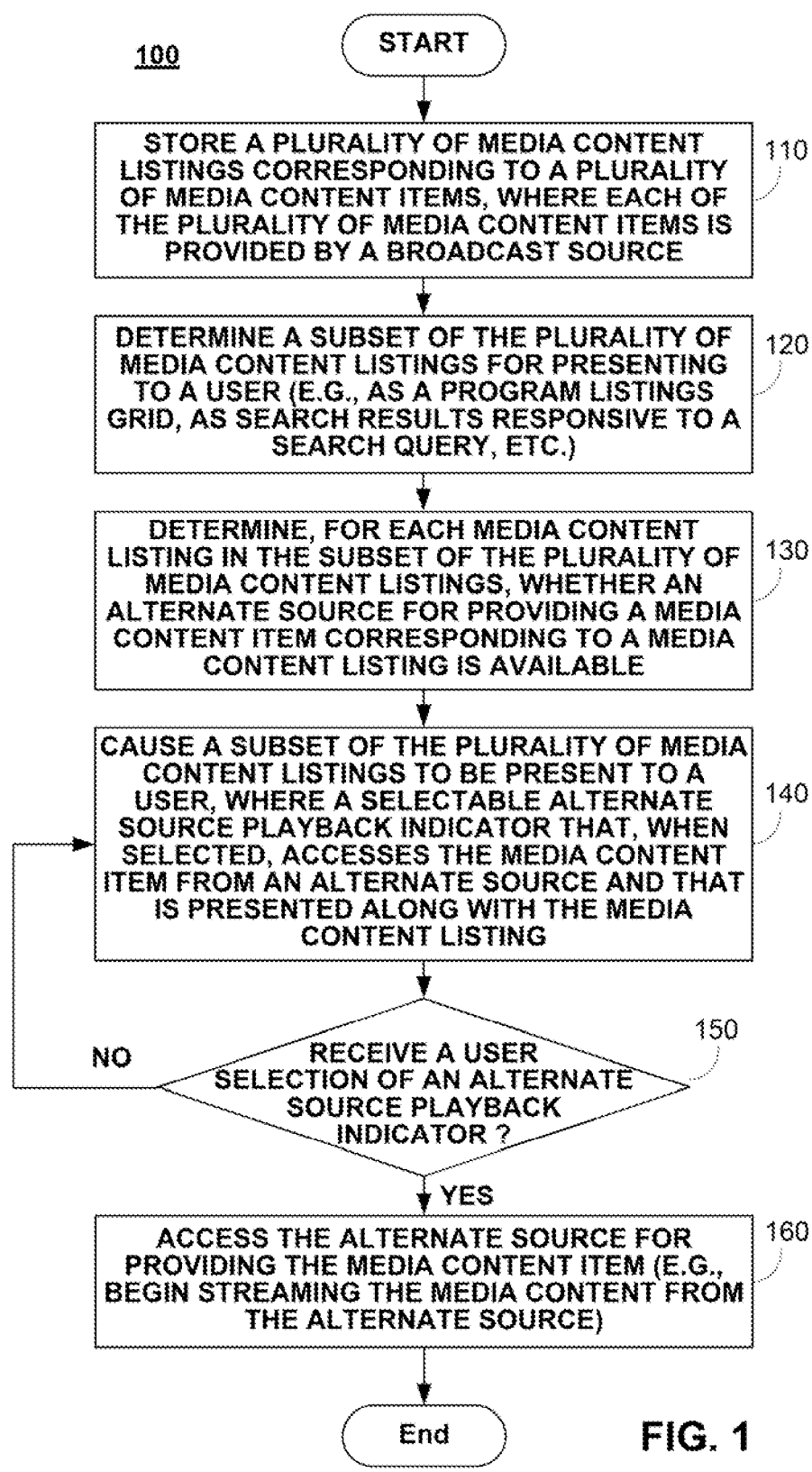

Guide

200

| | TODAY 3 JUL | 6:00PM | 6:30PM | 7:00PM |
|---|---|---|---|---|
| 114 VH1 | IMAGE [DORA THE EXPLORER] | Single Ladies | | Single Ladies |
| 115 COMEDY | Dora the Explorer<br>Hic-Boom-Ohhh<br>NJCJR<br>6:00PM – 6:30PM<br>30 min | 30 Rock ▲ | 30 Rock ▲ | The Colbert Report |
| 116 BET | | 106 & Park: BET's Top 10 Live | | |
| 117 SPIKE | | Star Wars: Episode III – Revenge of the Sith | | |
| 118 NICK | Dora and Boots investigate a strange sound. | Victorious | Victorious | Figure It Out |
| 119 NICK JR | | Dora the Explorer ▲<br>220 | Dora the Explorer ▲<br>230 | Go, Diego, Go! ▲ |
| 120 CMT | | Redneck Island | | Redneck Island |

210

[ HELP ]　　　　　　　　　　　　　　　　　　　　　[ OPTIONS ] 240

FIG. 2

Guide

| | TODAY 3 JUL | 6:00PM | 6:30PM | 7:00PM |
|---|---|---|---|---|
| 114 VH1 | | Single Ladies | | Single Ladies |
| 115 COMEDY | IMAGE [DORA THE EXPLORER] | 30 Rock ▲ | 30 Rock ▲ | The Colbert Report |
| 116 BET | Dora the Explorer<br>Hic-Boom-Ohhh<br>NJCJR<br>6:00PM – 6:30PM<br>30 min | 106 & Park: BET's Top 10 Live | | |
| 117 SPIKE | | Star Wars: Episode III – Revenge of the Sith | | |
| 118 NICK | | Victorious | Victorious | Figure It Out |
| 119 NICK JR | Dora and Boots investigate a strange sound. | Dora the Explorer<br>220 ▲ ─230 | Dora the Explorer ▲ | Go, Diego, Go! ▲ |
| 120 CMT | | Redneck Island | | Redneck Island |

310 ─► 210

HELP      OPTIONS

Guide

| | TODAY 3 JUL | 6:00PM | 6:30PM | 7:00PM |
|---|---|---|---|---|
| 114 VH1 | IMAGE [DORA THE EXPLORER] Dora the Explorer Hic-Boom-Ohhh NJCJR 6:00PM – 6:30PM 30 min Dora and Boots investigate a strange sound. | Single Ladies | | Single Ladies |
| 115 COMEDY | | 30 Rock ▲ | 30 Rock ▲ | The Colbert Report |
| 116 BET | | 106 & Park: BET's Top 10 Live | | |
| 117 SPIKE | | Star Wars: Episode III – Revenge of the Sith | | |
| 118 NICK | | Victorious | Victorious | Figure It Out |
| 119 NICK JR | | Dora the Explorer △ ⟋900 | Dora the Explorer △ | Go, Diego, Go! △ |
| 120 CMT | | Redneck Island | | Redneck Island |

210
230
240

HELP    OPTIONS

FIG. 9

METHODS, SYSTEMS, AND MEDIA FOR PROVIDING MEDIA GUIDANCE WITH MEDIA CONTENT FROM ALTERNATE SOURCES

CROSS-REFERENCE TO RELATED APPLICATION

This application is a continuation of U.S. patent application Ser. No. 13/648,083, filed Oct. 9, 2012, which is hereby incorporated by reference herein in its entirety.

TECHNICAL FIELD

Methods, systems, and media for providing media guidance with media content from alternate sources are provided.

BACKGROUND

There is an overwhelming volume of media content that is available to the average consumer. More particularly, there are many applications that a consumer can use on a television or set-top box that allow the consumer to consume media content from various sources. For example, a consumer can select between media content that is delivered linearly from a multichannel video programming distributor, video-on-demand content that is provided by a multichannel video programming distributor, personal media content that is acquired by the consumer, recorded content that is stored on a digital video recorder or any other suitable storage device, and/or on-demand content that is provided from over-the-top providers.

As the number of sources continues to increase (e.g., additional over-the-top providers of on-demand content), media guidance becomes increasingly important. For example, prior to making a decision on which media content to view, the consumer is generally required to select which content source to access either by running a particular application or accessing a particular section in an application.

SUMMARY

In accordance with some embodiments of the disclosed subject matter, mechanisms for providing media guidance with media content from alternate sources are provided.

In accordance with some embodiments of the disclosed subject matter, a method for providing media guidance with a plurality of media sources is provided, the method comprising: storing, using a hardware processor, a plurality of media content listings corresponding to a plurality of media content items, wherein each of the plurality of media content items is provided by a content source; determining, using the hardware processor, a subset of the plurality of media content listings for presenting to a user; determining, using the hardware processor, for each media content listing in the subset of the plurality of media content listings, whether an alternate source for providing a media content item corresponding to a media content listing is available, wherein the alternate source is different from the content source; and causing, using the hardware processor, a subset of the plurality of media content listings to be presented to the user, wherein a selectable alternate source indicator is presented within the corresponding media content listing in response to determining that the media content item is available from the alternate source.

In some embodiments, the media content item is accessed from the alternate source in response to receiving a user selection of the selectable alternate source indicator. It should be noted that, in some embodiments, the content source is a broadcast television source and the alternate source is an over-the-top content source.

In some embodiments, the subset of the plurality of media content listings is presented to the user as a program listings grid having one or more rows of program listings.

In some embodiments, the subset of the plurality of media content listings is presented to the user as a list of search results responsive to a search query from the user.

In some embodiments, the determination of the alternate source is performed for each of the subset of the plurality of media content listings for presenting to the user.

In some embodiments, the determination of the alternate source is performed for each of the plurality of media content listings.

In some embodiments, the determination of the alternate source further includes accessing a priority list having at least a first alternate source and a second alternate source; determining whether the media content item is available from the first alternate source; determining whether the media content item is available from the second alternate source in response to determining that the media content item is unavailable from the first alternate source; and presenting the selectable alternate source indicator in response to determining that the media content item is available from the second alternate source, wherein the second alternate source is assigned to the media content item.

In some embodiments, in response to determining that the media content item is available from the second alternate source, additional alternate sources are inhibited from being searched for the media content item.

Alternatively, in some embodiments, in response to determining that the media content item is available from multiple alternate sources, the available alternate source is assigned to the media content item based on a position in the priority list.

In some embodiments, user login information is stored along with the alternate source and, in response to receiving the user selection of the selectable alternate source indicator, the media content item is automatically retrieved from the alternate source using the stored user login information.

In accordance with some embodiments of the disclosed subject matter, a system for providing media guidance with a plurality of media sources is provided. The system comprising: a storage device for storing a plurality of media content listings corresponding to a plurality of media content items, wherein each of the plurality of media content items is provided by a content source; and a processor that is configured to: determine a subset of the plurality of media content listings for presenting to a user; determine, for each media content listing in the subset of the plurality of media content listings, whether an alternate source for providing a media content item corresponding to a media content listing is available, wherein the alternate source is different from the content source; and cause a subset of the plurality of media content listings to be presented to the user, wherein a selectable alternate source indicator is presented within the corresponding media content listing in response to determining that the media content item is available from the alternate source.

In accordance with some embodiments of the disclosed subject matter, a non-transitory computer-readable medium containing computer-executable instructions that, when executed by a processor, cause the processor to perform a method for providing media guidance with a plurality of media sources, is provided. The method comprises: storing a plurality of media content listings corresponding to a plurality of media content items, wherein each of the plurality of media content items is provided by a content source; determining a subset of the plurality of media content listings for presenting to a user; determining, for each media content listing in the subset of the plurality of media content listings, whether an alternate source for providing a media content item corresponding to a media content listing is available, wherein the alternate source is different from the content source; and causing a subset of the plurality of media content listings to be presented to the user, wherein a selectable alternate source indicator is presented within the corresponding media content listing in response to determining that the media content item is available from the alternate source.

BRIEF DESCRIPTION OF THE DRAWINGS

Various objects, features, and advantages of the disclosed subject matter can be more fully appreciated with reference to the following detailed description of the disclosed subject matter when considered in connection with the following drawing, in which like reference numerals identify like elements.

FIG. 1 is a flowchart of an illustrative process for providing media guidance with media content items from various sources using an alternate source playback indicator in accordance with some embodiments of the disclosed subject matter.

FIGS. 2 and 3 are illustrative screens of a grid guide of media content listings, where an alternate source playback indicator is provided along with a media content listing that indicates the corresponding media content item is available from an alternate source, in accordance with some embodiments of the disclosed subject matter.

FIG. 9 is an illustrative screen of a grid guide of media content listings, where additional alternate source playback indicators are provided along with a media content listing in accordance with some embodiments of the disclosed subject matter.

DETAILED DESCRIPTION

Figure 4:
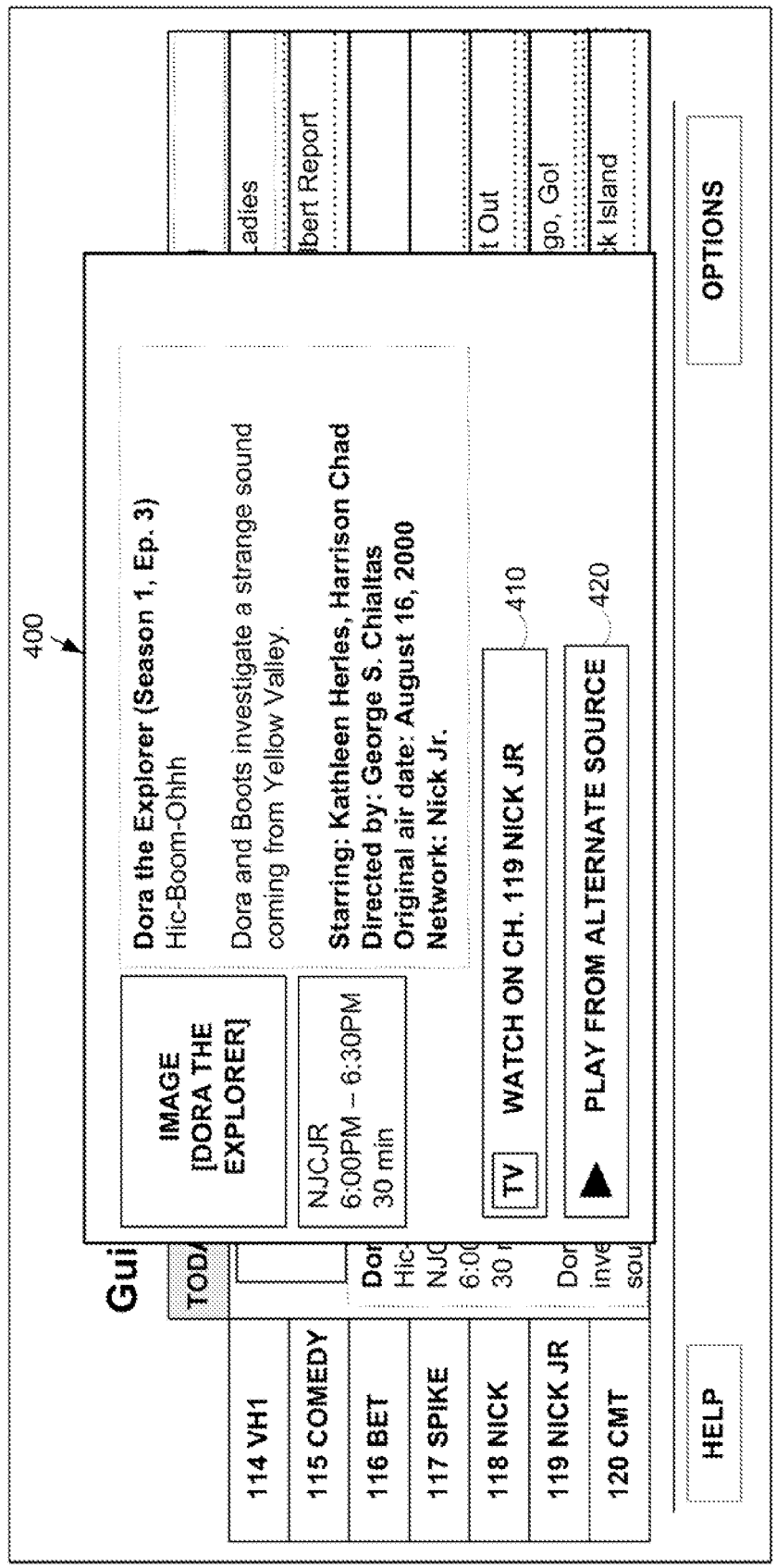
FIG. 4 is an illustrative screen of a detailed description region that includes options for obtaining the media content item from a television provider or from an alternate source in accordance with some embodiments of the disclosed subject matter.

In accordance with some embodiments of the disclosed subject matter, mechanisms for presenting media content from alternate sources are provided. For example, in a media guidance application that provides media listings in a listings grid organized by time and by channel, the media guidance application can determine whether the media content item associated with at least one of the media listings is also available for playback from an alternate source. The alternate source can include, for example, a digital video recorder (DVR), an over-the-top (OTT) content source, a video-on-demand (VOD) content source, and/or any other suitable source. In this example, the alternate source can be a source that is different from the television program source providing the media listings in a listings grid organized by time and channel.

The media guidance application can access the available alternate sources to determine whether the media content item is available for playback from one of the available sources. For example, the media guidance application can determine which alternate source is configured on a user television device (e.g., which media playback applications have been downloaded, which alternate content sources are provided by a service provider, etc.). In another example, the media guidance application can receive a prioritized list of alternate sources from the user (e.g., check recorded content on a digital video recorder first, check over-the-top content available from one or more over-the-top content providers second, check video-on-demand content third, etc.). In yet another example, for particular types of content (e.g., over-the-top content), the media guidance application can use an application program interface associated with a content provider to transmit a request for a media content item.

In response to determining that a media content item in the media guide listings has an alternate source for providing the content item, the media guidance application can provide the user with an alternate source playback indicator within the media guide listings. For example, a "play" icon or any other suitable alternate source playback indicator can be displayed as part of the media guide listing for that content item. In another example, an alternate source playback indicator can be displayed as part of any suitable listing of the media content item. In yet another example, an alternate source playback indicator can be displayed on a detailed program screen describing the media content item.

In response to the user selecting the alternate content indicator (e.g., by pressing a dedicated play button on a remote control or any other suitable user interface, by selecting the play icon using a user interface device, etc.), the media guidance application can automatically determine which alternate source to playback the content item and initiate playback of the content item. For example, the media guidance application can use stored login and password information associated with the user to access the alternate source (e.g., a specific over-the-top content provider) and automatically begin downloading or streaming the content item. Alternatively, the media guidance application can direct the user to a landing page that allows the user to access the content item (e.g., the page associated with a particular over-the-top content provider for streaming the particular episode of the program).

In some embodiments, the media guidance application can determine an alternate source from multiple sources for accessing the content item based on a priority list. For example, such a priority list can be received from the user. In this example, based on the priority list received from the user, the media guidance application can determine the availability of a content item from recorded content stored on a digital video recorder first, video-on-demand content items second, broadcast television programs third, and over-the-top sources fourth. In another example, the user can indicate that the media guidance application selects the least expensive alternate source for obtaining the content item. In yet another example, in response to determining multiple alternate sources that have the media content item available for playback, the media guidance application can obtain the media content item from the alternate source with the higher position in the priority list. This can, for example, provide an alternate source indicator and, when selected, automatically obtain the media content item from an alternate source without receiving a user selection of that source.

Although the embodiments described herein generally relate to provide an alternate source indicator within a program listings grid that is organized by channel and time, this is merely illustrative. For example, the media guidance application can be implemented with a search engine. In response to receiving a search query for a particular media content item or items, the media guidance application can provide the user with search results that indicate when each media content item is available to the user (e.g., a channel, a date, a time, etc.) and can provide the user with an opportunity to set a reminder, record the media content item, tune to the media content item (if currently available), etc. In addition, the media guidance application can also determine whether the media content items in the search results are available from an alternate source. Upon determining that a media content item is available from an alternate source (e.g., from an over-the-top source), the media guidance application can provide an alternate source indicator along with the search result corresponding to that media content item.

Turning to FIG. 1, FIG. 1 is a flow chart of an illustrative process 100 for providing a media guidance application, where a guidance display provides an alternate source indicator upon determining that a media content item is available from an alternate source, in accordance with some embodiments of the disclosed subject matter.

Process 100 can begin by receiving multiple media content listings, where each media content listing corresponds to a media content item (e.g., a television program, a video clip, etc.) at 110. For example, the media guidance application can receive content listings and/or other media guidance data (e.g., broadcast times, broadcast channels, titles, descriptions, category information, media format information, etc.). As shown in a program listings grid 200 in FIG. 2, the media guidance data can include broadcast times (e.g., 6:00 PM-6:30 PM), broadcast channel information, titles, descriptions, duration, media format information (e.g., high definition), etc. These multiple content listings can be stored in any suitable storage device.

Referring back to FIG. 1, at 120, a subset of the multiple content listings can be determined for presenting to the user. For example, the media guidance application can cause a subset of the multiple media content listings to be presented by selecting a selectable option in a display screen (e.g., a listings option) or pressing a dedicated button (e.g., a guide button) on a remote control or other user input interface. In a more particular example, as shown in the program listings grid 200 of FIG. 2, the media guidance application can select a subset of multiple content listings, such as media content listing 210, for presenting to the user based on a particular time window and a particular set of channels. In another example, the media guidance application can cause media content listings, such as media content listing 210, to be presented in a list of search results responsive to a search query (e.g., "Dora") inputted by the user.

Referring back to FIG. 1, at 130, for each media content listing in the subset of presented multiple content listings, the media guidance application can determine whether an alternate source for providing the media content item corresponding to the media content listing is available. Additionally or alternatively, the media guidance application can determine whether an alternate source for providing a media content item corresponding to a media content listing is available for each received and/or stored media content listing (e.g., each media content listing stored in a set-top box, each media content listing stored in a tablet computing device having media viewing capabilities, etc.).

In some embodiments, the determination can include determining which alternate sources are available to the user and determining whether the media content item is available for playback from one or more of these alternate sources. In a more particular example, the media guidance application can determine that a user at a media playback device has access to video-on-demand (VOD) content and pay-per-view (PPV) provided by a multichannel video programming distributor, personal media content acquired by the consumer, recorded content stored on a digital video recorder or any other suitable storage device, and/or on-demand content from various over-the-top providers. In some embodiments, the media guidance application can detect which media playback applications have been configured on the media playback device (e.g., the user installed an application for a particular over-the-top content source, the media playback application or device has access to a particular over-the-top content source, etc.). The media guidance application can then search through metadata or any other suitable guidance data to determine whether the media content item is available from one of these alternate sources. Additionally or alternatively, the media guidance application can transmit a query to each of these alternate sources that requests an indication of whether an alternate source can playback the media content item.

As explained in more detail below, the media guidance application can access a priority list for determining which alternate source to provide a media content item. In some embodiments, the media guidance application can access a priority list to determine which alternate source to search first prior to proceeding to other alternate sources. For example, the priority list can direct the media guidance application to determine whether a particular media content item is available from recorded content on a digital video recorder first and then, if not available from the digital video recorder, determine whether the particular media content item is available from an over-the-top content source next. The priority list can be used to inhibit the media guidance application from searching through particular alternate sources. Additionally or alternatively, the media guidance application can access a priority list to determine which alternate source is assigned to a particular media content item. For example, in response to determining that a media content item is available from multiple alternate sources (e.g., a VOD service, a recording device, a linear live television content provider, a particular over-the-top content provider, etc.), the media guidance application can access a priority list to determine which alternate source to assign to the media content item (e.g., the alternate source having the highest position in the priority list).

At 140, the subset of the plurality of media content listings can be presented to the user. For example, as shown in FIG. 2, the media guidance application can select a subset of multiple content listings, such as media content listing 210, for presenting to the user in a program listings grid 200. Program listings grid 200 is arranged by time (e.g., a row of time blocks between 6:00 PM and 7:30 PM) and by channel (e.g., a column of channel identifiers including channels 114 through 120) and allows a user to view programs and other media content items available at those times and on those channels.

It should be noted that, in some embodiments, the media guidance application can be implemented on a mobile device or a tablet computing device, where program listings grid 200 including the subset of the plurality of media content listings can be presented on such a device. As described in further detail below, in some embodiments, the subset of the plurality of media content listings can be provided to the user on a second screen device, such as a mobile device or a tablet computing device. In such an embodiment, program listings grid 200 including the subset of the plurality of media content listings can be provided to the user on the second screen device.

In some embodiments, for each media content item that is determined to be available for playback from an alternate source, the media guidance application can provide an alternate source playback indicator. The alternate source playback indicator can be presented along with the media content listing and, when selected by a user, can direct the media guidance application or any other suitable application to access the media content item associated with the alternate source playback indicator. For example, as shown in FIG. 2, an alternate source playback indicator 220 in the form of a play icon is displayed within the media content listing 210. More particularly, the alternate source playback indicator 220 in the form of a play icon is provided for the media content item "Dora the Explorer" provided on channel 119 (NICK JR). As also shown, alternate source playback indicators are provided along with various media content listings in grid display 200 (e.g., for particular "30 Rock" content items, for particular "Dora the Explorer" content items, and for particular "Go, Diego, Go!" content items).

Using a user input device (e.g., a remote control, a keyboard, a touchpad, a mobile phone, etc.), a user can select media content listings by moving a highlight region 230. As shown in FIG. 3, in addition to selecting media content listings, highlight region 230 can be moved onto alternate source playback indicator 220. Alternatively, alternate source playback indicator 220 can be selected by pressing a dedicated play button on a remote control or any other suitable user interface, by selecting the play icon using a user input device, etc.

In some embodiments, in response to highlighting or otherwise selecting a media content listing (e.g., media content listing 210), the media guidance application can provide the user with a region including additional information. For example, as shown in FIG. 3, in response to selecting media content listing 210 using a user input device, the media guidance application can display region 310. As shown, in response to selecting media content listing 210 that corresponds to a particular episode of "Dora the Explorer," region 310 can be displayed that includes an image, a program title, a channel identifier, timing information, and a description associated with the media content item "Dora the Explorer." In some embodiments, the media guidance application can also provide the user with alternate source playback indicator 220 within region 310.

In some embodiments, in response to requesting detailed information relating to a media content item, the media guidance application can provide the user with a detailed information region. For example, as shown in FIG. 4, in response to requesting detailed information on a particular episode of "Dora the Explorer," the media guidance application can display detailed information region 400. More particularly, detailed information region 400 can include an image associated with the media content item "Dora the Explorer," the program title, episodic information (e.g., season number, episode number, etc.), a detailed description of the media content item, airing date information, network information, etc. As also shown in FIG. 4, the media guidance application can provide the user with an option to playback the media content item (e.g., the "Hic-Boom-Ohhh" episode of the "Dora the Explorer" program) from the television provider (e.g., by tuning to channel 119) using option 410 or from an alternate source using option 420.

Figure 5:
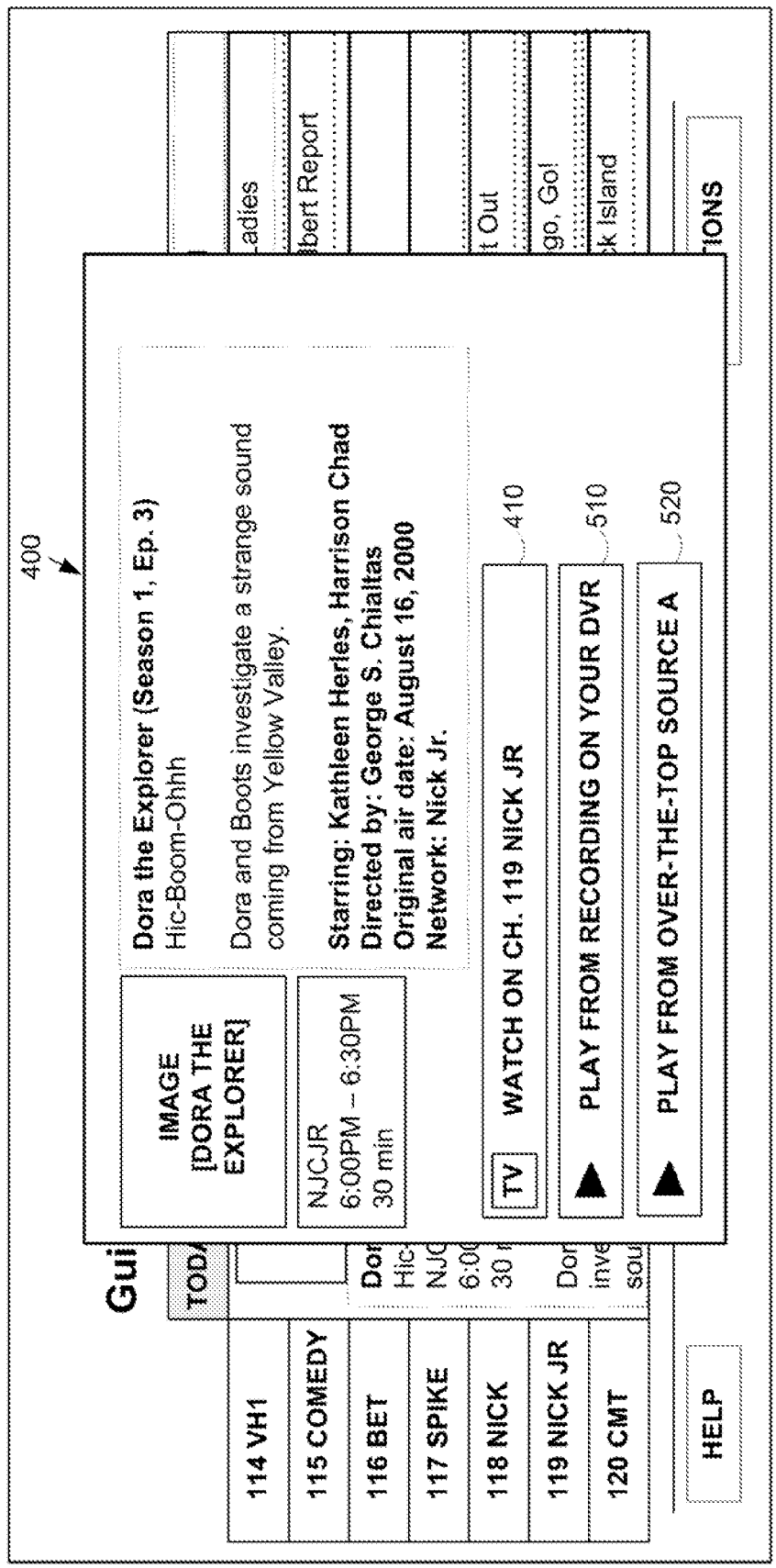
FIG. 5 is an illustrative screen of a detailed description region that includes options for obtaining the media content item from a television provider or from multiple alternate sources in accordance with some embodiments of the disclosed subject matter.

It should be noted that, in some embodiments, the media guidance application can automatically determine which alternate source to provide the media content item (e.g., the alternate source having the highest position in a priority list). As shown in FIG. 4, the media guidance application can automatically determine which alternate source from multiple alternate sources to provide the media content item and provide the user with option 420 to automatically access the media content item from that alternate source. Alternatively, in some embodiments, the media guidance application can provide the user with an opportunity to select from the available alternate sources. For example, as shown in FIG. 5, the media guidance application can provide detailed information region 400 for the media content item (e.g., the "Hic-Boom-Ohhh" episode of the "Dora the Explorer" program) and provide the user with an opportunity to select to playback the media content item from one alternate source—e.g., by selecting option 510 to access a recorded version of the particular episode of the "Dora the Explorer" program stored on a digital video recorder or any other suitable storage device—or from another alternate source—e.g., by selecting option 520 to access the media content item provided by a particular over-the-top content provider (e.g., over-the-top source A).

Referring back to FIG. 1, in response to receiving a user selection of an alternate source playback indicator at 150 (e.g., one of the alternate source playback indicators displayed within program grid 200), the media guidance application can access the alternate source for providing the media content item to the user at 160. For example, the media guidance application can use stored login and password information associated with the user to access the alternate source (e.g., a particular over-the-top content provider) and automatically begin downloading or streaming the media content item. More particularly, an illustrative example of a full sized display screen 610 playing back a media content item 620 is provided in FIG. 10. As shown, the media guidance application can automatically obtain the media content item 620 from the alternate source 630 (e.g., without receiving a source identifier from the user). In this example, in response to selecting the alternate source playback indicator, the media guidance application has determined that the media content item for "Dora the Explorer" (Season 1, Episode 3, "Hic-Boom-Ohhh") is available from a video-on-demand provider and has started to playback the media content item from the video-on-demand provider.

Alternatively, the media guidance application can direct the user to a landing page that allows the user to access the content item. In the example above, the media guidance application can provide the user with a landing page of a particular over-the-top content provider for streaming the particular episode of the program. In such an example, the landing page can provide the user with an opportunity to view a detailed information page associated with the media content item provided by the particular over-the-top content provider. In addition, the landing page can request that the user provide login and password information and/or paying information prior to playing back the media content item.

As described above, in some embodiments, the media guidance application can use a priority list for determining which alternate source to assign to a media content item. It should also be noted that, in some embodiments, the alternate source playback indicator can indicate that media content item is available for playback from at least one of multiple alternate sources and, in response to receiving a user selection, the media guidance application can use the priority list to determine which alternate source to access for playing back the media content item.

Figure 7:
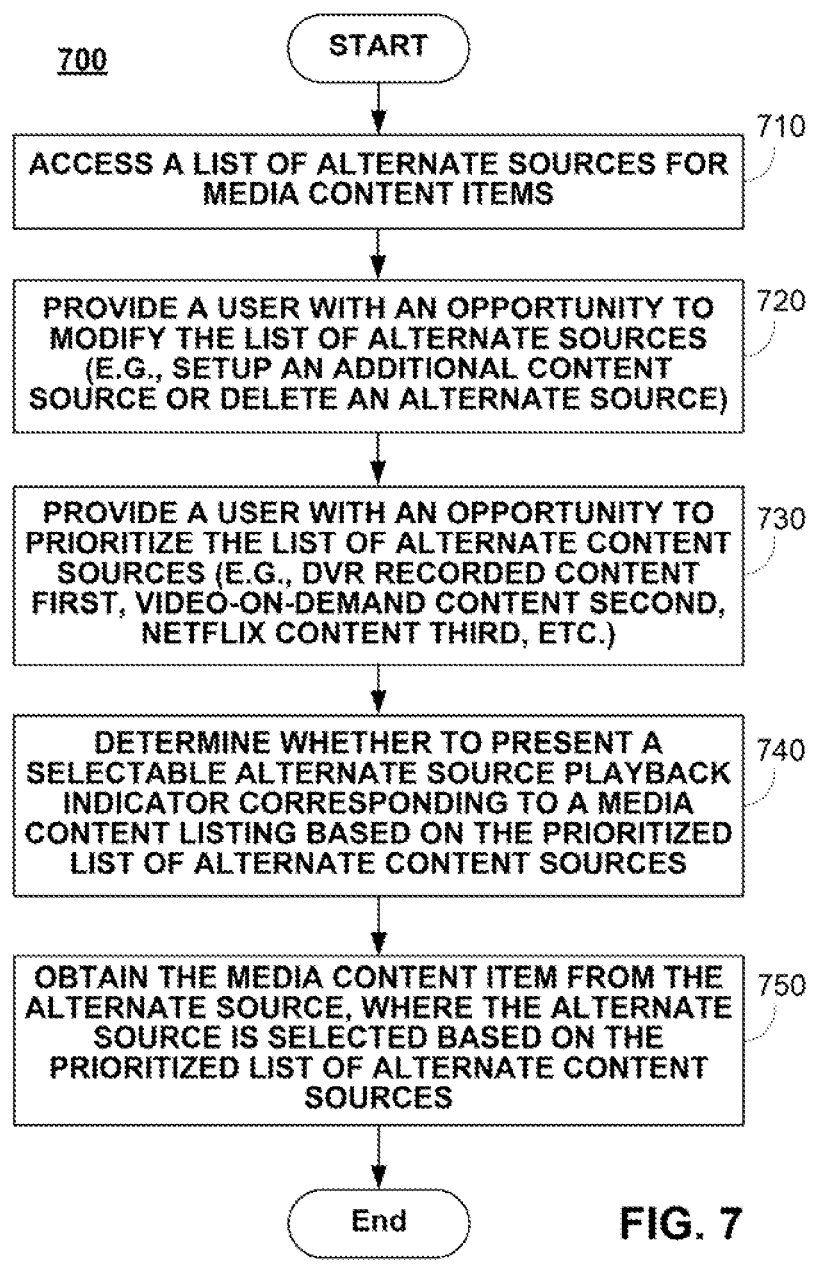
FIG. 7 is a flowchart of an illustrative process for using priority lists to select an alternate source from multiple alternate sources and/or determine whether to present an alternate source playback indicator in accordance with some embodiments of the disclosed subject matter.
Figure 8:
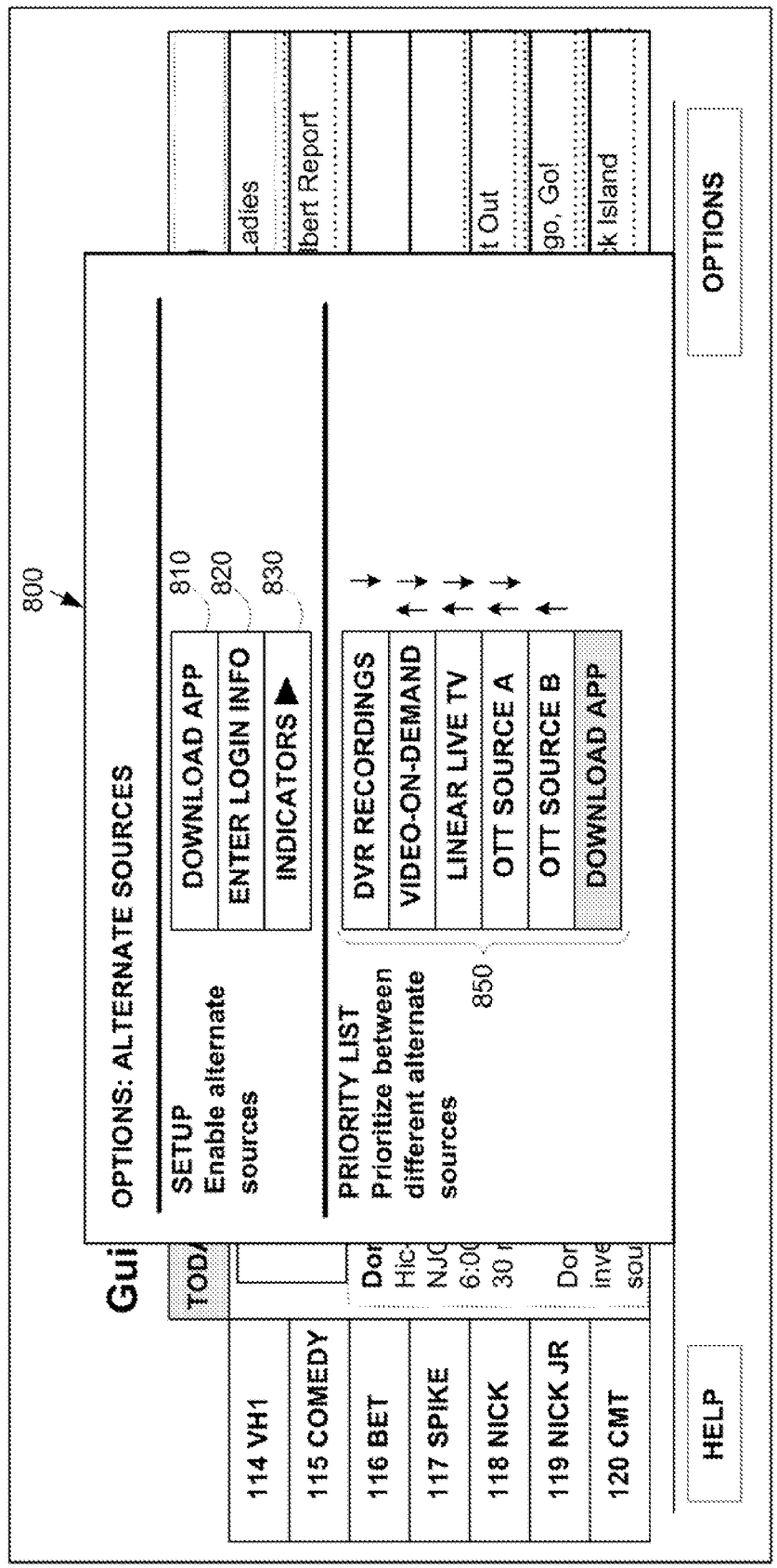
FIG. 8 is an illustrative screen of an alternate source configuration region in accordance with some embodiments of the disclosed subject matter.

Turning to FIG. 7, the media guidance application can access a list of alternate sources for media content items at 710. For example, referring back to FIG. 2, the media guidance application can provide the user with a media configuration option 240. In response to selecting option 240, the media guidance application can provide the user with an opportunity to add or remove alternate sources at 720. For example, as shown in FIG. 8, the media guidance application can provide the user with an opportunity to download a media playback application using option 810, provide login and/or password information using option 820, and/or configure the presentation of alternate source playback indicators using option 830.

In response to selecting option 810, the media guidance application can direct the user to obtain and/or install one or more media playback applications that connect the media playback device with the alternate source. For example, a tablet computing device capable of playing back media content can download and install a media playback application provided by a first over-the-top content provider or a second over-the-top content provider. In another example, in response to installing and/or configuring a media playback application, the media guidance application can add the alternate source to the priority list. In yet another example, the media guidance application running on various computing devices (e.g., a set-top box and a tablet computing device) can determine which media playback applications are configured on each of the various computing devices. In such an example, if a media content item is available from an alternate source using a media playback application installed on a tablet computing device, the media guidance application can prompt the user to either install and configure the media playback application on the set-top box or playback the media content item on the tablet computing device.

In response to selecting option 820, the media guidance application can receive user name and/or password information associated with the user for accessing one or more alternate sources. For example, when accessing a particular alternate source for playing back a media content item, the media guidance application can use the username and/or password information to automatically access the alternate source and begin retrieving the media content item for playback to the user. In another example, when username and/or password information has not been provided and an alternate source playback indicator has been selected, the media guidance application can direct the user to a landing page for obtaining the particular media content item. In such an example, the media content item can be directly played from the landing page.

In response to selecting option 830, the media guidance application can provide the user with various options for presenting the alternate source playback indicator. For example, the media guidance application can allow the user to view alternate source playback indicators for particular media listings (e.g., display alternate source playback indicators with search results and with media content listings displayed in a grid guide). In another example, the media guidance application can allow the user to provide different alternate source playback indicators for particular alternate sources (e.g., a red-colored indicator indicates that a payment is required for accessing the media content item from the alternate source, a green-colored indicator indicates that the media content item is currently available for retrieval from the alternate source, etc.). In yet another example, the media guidance application can allow the user to select an alternate source playback indicator having a different appearance than the alternate source playback indicator shown in the embodiments described herein (e.g., different color, different shape, different button for activation on a user input device, etc.).

In some embodiments, the media guidance application can determine that a media content item is available from an alternate source that is currently unavailable. For example, the media guidance application can transmit a request to various alternate sources for a media content item and, in response to receiving the response from the various alternate sources, the media guidance application can determine that the media content item is available from an alternate source that has not been configured on the media playback device. For example, as shown in FIG. 9, a hollow alternate source playback indicator 900 is provided, which can indicate that the media content item is available from an alternate source that is currently unavailable.

Figure 10:
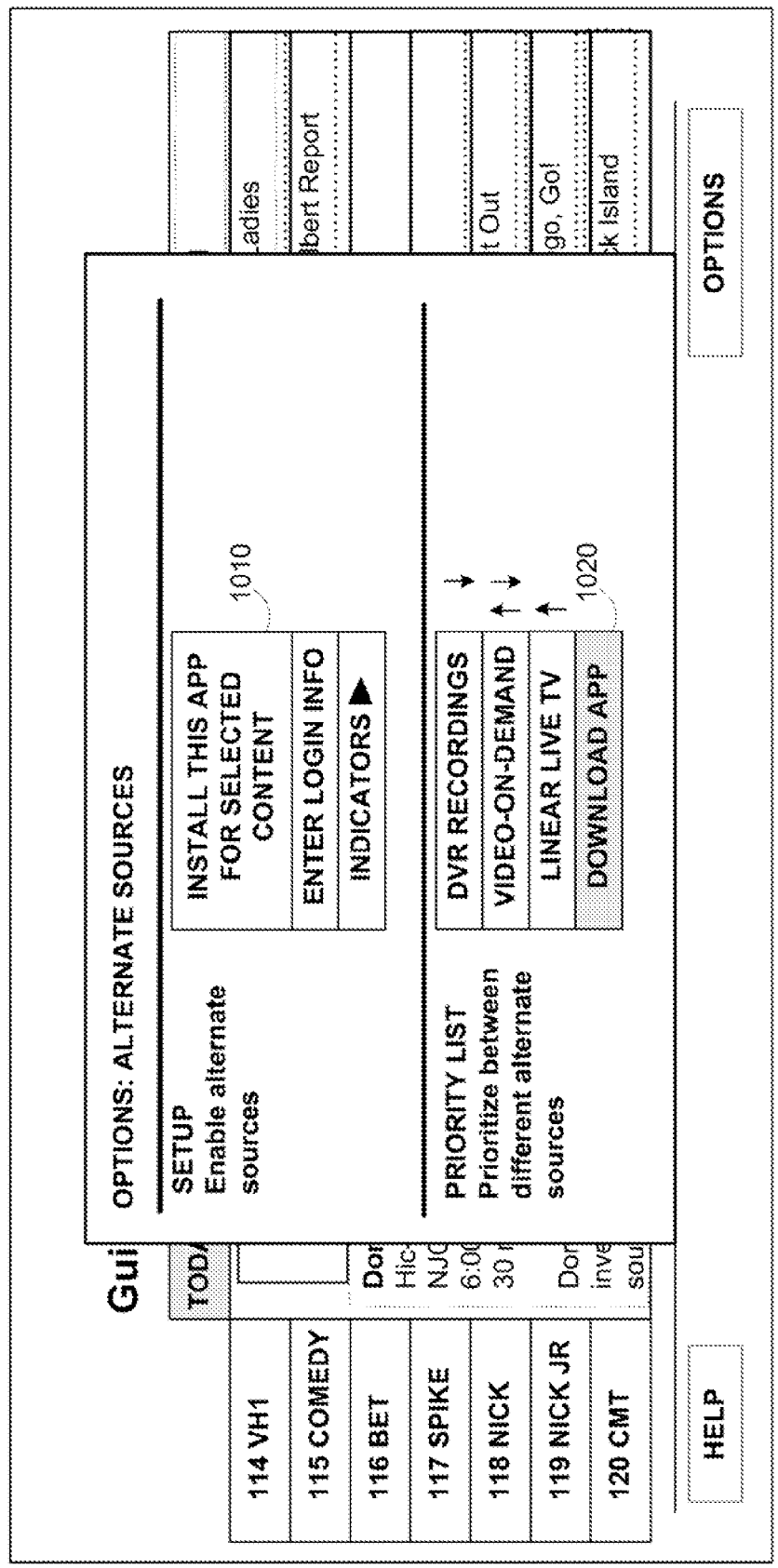
FIG. 10 is an illustrative screen of an alternate source configuration region, where the media guidance application assist the user to configure a particular alternate source for obtaining media content items, in accordance with some embodiments of the disclosed subject matter.

In response to selecting alternate source playback indicator 900, the media guidance application can direct the user to the configuration region 800 for configuring the alternate source. For example, this can include downloading a media playback application corresponding to the alternate source. In another example, as shown in FIG. 10, the media guidance application can assist the user to configure the media playback application corresponding to the alternate source. As shown, the media playback application can provide the user with option 1010 for automatically obtaining a media playback application corresponding to the alternate source. In addition, the media playback application can provide the user with option 1020 for automatically obtaining a media playback application corresponding to the alternate source within the priority list.

Referring back to FIG. 7, in response to configuring the alternate sources, the media guidance application can provide the user with an opportunity to prioritize the list of alternate content sources at 730. For example, as shown in FIG. 8, the media guidance application can provide the user with a priority list 850 of alternate sources, where the user can assign a particular alternate source with a higher priority level or a lower priority level with respect to another alternate source. As shown in priority list 850, the user has indicated that, for alternate sources, the media guidance application can determine the availability of a media content item from recorded content on a digital video recorder first, on-demand content from a video-on-demand provider second, broadcast content third, content obtained from a first over-the-top content provider (e.g., OTT source A) fourth, and contend obtained from a second over-the-top content provider (e.g., OTT source B) fifth. Alternatively, the media guidance application can determine whether the media content item is available from any of these alternate sources and use priority list 850 to determine which alternate source to assign to the media content item for playing back the media content item (e.g., the alternate source having a higher position within priority list 850).

In some embodiments, the media guidance application can provide the user with an opportunity to set payment information associated with priority list 850. For example, the media guidance application can allow the user to indicate that an alternate source is considered available for playing back a media content item if the fee associated with obtaining that media content item is less than five dollars. In another example, the media guidance application can allow the user to indicate that the least expensive alternate source for obtaining the media content item is selected.

Figure 6:
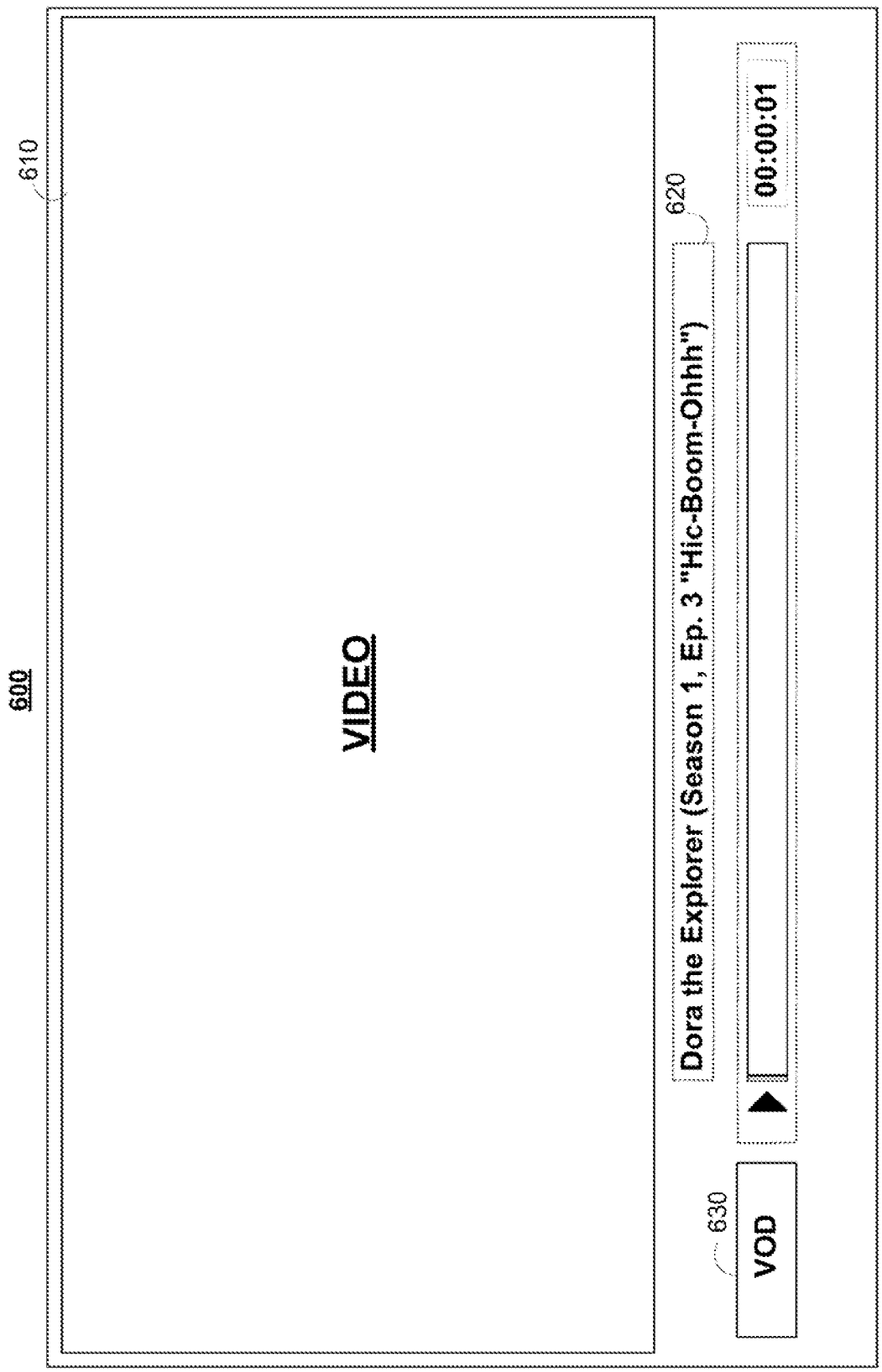
FIG. 6 is an illustrative screen of a video region for playing back the media content item in accordance with some embodiments of the disclosed subject matter.

Based on priority list 850 and other user-configured settings, the media guidance application can determine whether to present a selectable alternate source indicator corresponding to a media content listing at 740. Similar to 160 of FIG. 6, the media guidance application can obtain the media content item from the alternate source, where the alternate source is selected based on the priority list at 750.

It should be understood that the above steps of the flow diagram of FIGS. 1 and 7 can be executed or performed in any order or sequence not limited to the order and sequence shown and described in the figure. Also, some of the above steps of the flow diagrams of FIGS. 1 and 7 can be executed or performed substantially simultaneously where appropriate or in parallel to reduce latency and processing times.

It should be noted that, although the embodiments described herein generally relate to playing back media content items on a user television device, this is merely illustrative. For example, in some embodiments, the media guidance application can select an alternate source playback indicator associated with a media content listing (e.g., within a grid guide or listings display) presented on a user television device and, in response to the selection of the alternate source playback indicator, the media guidance application can instruct a second screen device (e.g., a tablet computing device, a mobile phone, etc.) to obtain and playback the media content item from the alternate source. Alternatively, the media guidance application running on a tablet computing device can be used to select an alternate source playback indicator associated with a media content listing presented by the tablet computing device, where the tablet computing device can instruct the user television device or any other suitable media playback device to obtain and playback the media content item from the alternate source.

Figure 11:
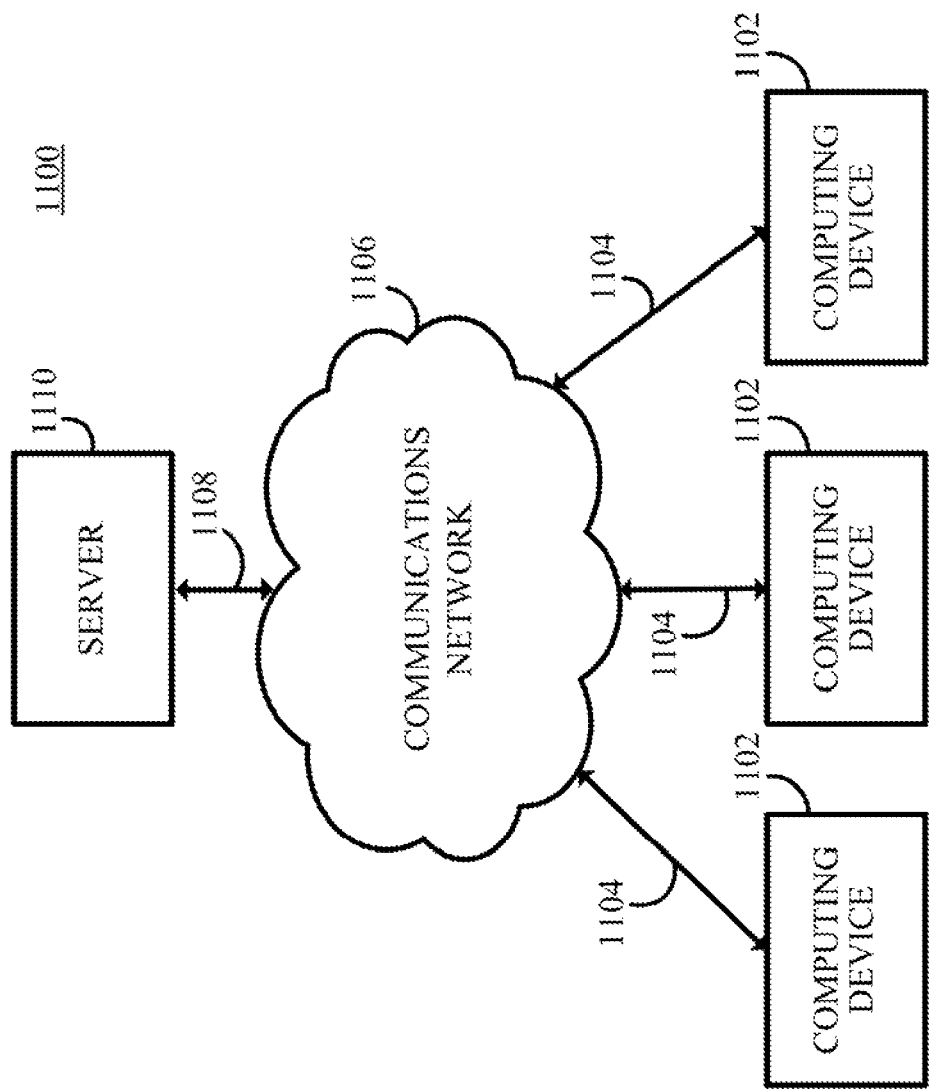
FIG. 11 is a diagram of an illustrative system suitable implementation of the media guidance application in accordance with some embodiments of the disclosed subject matter.

FIG. 11 is a generalized schematic diagram of a system on which the media guidance application can be implemented in accordance with some embodiments of the disclosed subject matter. As illustrated, system 1100 can include one or more computing devices 1102, such as a user computing device for viewing media content listings and/or obtaining and playing back media content items from various sources, a tablet computing device for transmitting user instructions to a television device, etc. For example, computing device 1102 can be implemented as a personal computer, a tablet computing device, a personal digital assistant (PDA), a portable email device, a multimedia terminal, a mobile telephone, a gaming device, a set-top box, a television, a smart television, etc.

In some embodiments, computing device 1102 can include a storage device, such as a hard drive, a digital video recorder, a solid state storage device, a gaming console, a removable storage device, or any other suitable device for storing media content, media guidance information, etc.

In some embodiments, computing device 1102 can include a second screen device. For example, the second screen device can display a guidance display (e.g., a grid guide of media content listings) and, in response to receiving a user selection, can transmit playback instructions to a television device. In another example, a second screen device can present the user with alternate source preferences, where the alternate source preferences are transmitted to a set-top box or a television device.

Computing devices 1102 can be local to each other or remote from each other. For example, when one computing device 1102 is a television and another computing device 1102 is a second screen device (e.g., a tablet computing device, a mobile telephone, etc.), the computing devices 1102 may be located in the same room. Computing devices 1102 are connected by one or more communications links 1104 to a communications network 1106 that is linked via a communications link 1108 to a server 1110.

System 1100 can include one or more servers 1110. Server 1110 can be any suitable server for providing access to the media guidance application, such as a processor, a computer, a data processing device, or a combination of such devices. For example, the media guidance application can be distributed into multiple backend components and multiple frontend components or interfaces. In a more particular example, backend components, such as media guidance data distribution can be performed on one or more servers 1110. Similarly, the graphical user interfaces displayed by the media guidance application, such as a media content listings interface for accessing media content items or a search interface for retrieving media content items responsive to a search query, can be distributed by one or more servers 1110 to computing device 1102. For example, server 1110 can be operated by a content provider that stores media content items and/or media guidance data in one or more databases, where the media guidance application using server 1110 displays a guidance display or any other suitable graphical user interfaces to users for searching and/or accessing media content items.

In some embodiments, server 1110 can include any suitable server for providing content, such as broadcast content, on-demand content, over-the-top content, pay-per-view content, Internet content, and/or any other suitable media content. For example, server 1110 can include a content server for providing over-the-top content to one or more computing devices 1102. In some embodiments, server 1110 can include any suitable server for providing media guidance information, such as scheduled program times, content descriptions, channel information, network information, rating information, etc.

More particularly, for example, each of the computing devices 1102 and server 1110 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 1102 can be implemented as a personal computer, a tablet computing device, a personal digital assistant (PDA), a portable email device, a multimedia terminal, a mobile telephone, a gaming device, a set-top box, a television, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 11, communications network 1106 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 1104 and 1108 may be any communications links suitable for communicating data between computing devices 1102 and server 1110, such as network links, dial-up links, wireless links, hard-wired links, any other suitable communications links, or a combination of such links. Computing devices 1102 enable a user to access features of the application. Computing devices 1102 and server 1110 may be located at any suitable location. In one embodiment, computing devices 1102 and server 1110 may be located within an organization. Alternatively, computing devices 1102 and server 1110 may be distributed between multiple organizations.

Figure 12:
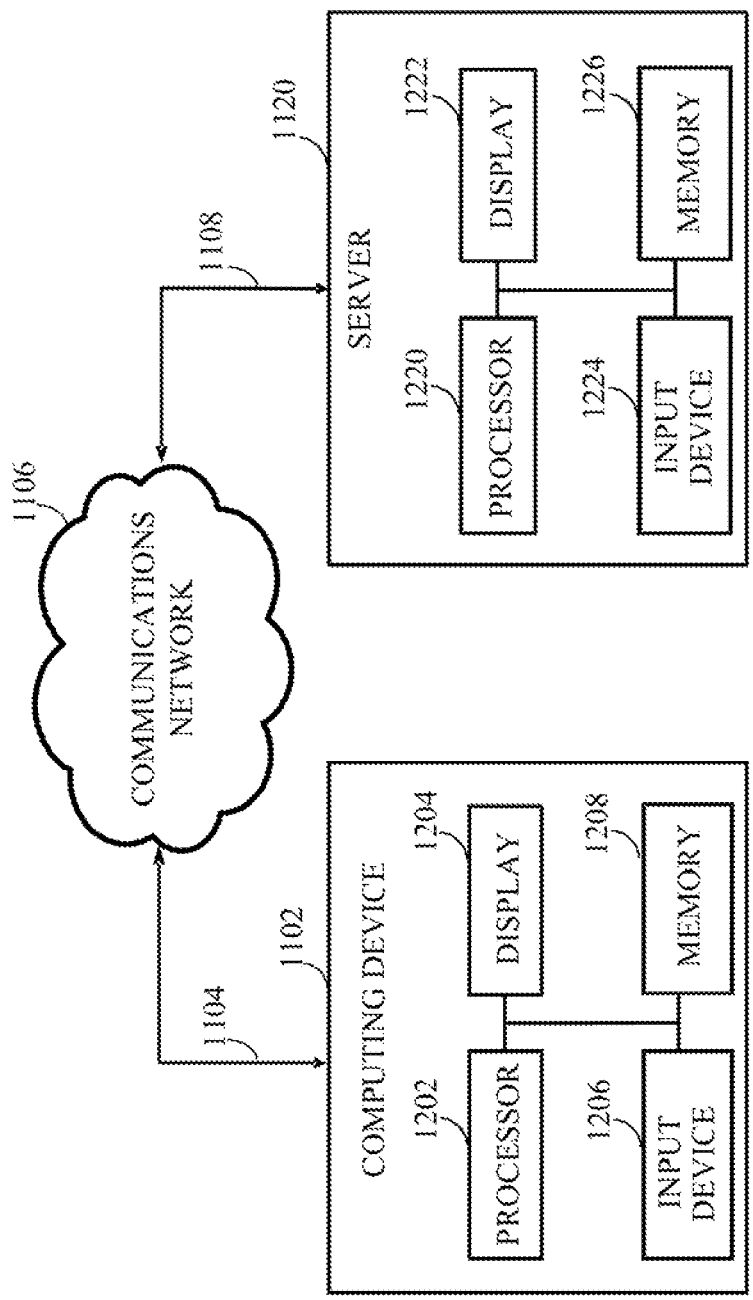
FIG. 12 is a diagram of an illustrative computing device and server as provided, for example, in FIG. 11 in accordance with some embodiments of the disclosed subject matter.

Referring back to FIG. 11, the server and one of the computing devices depicted in FIG. 11 are illustrated in more detail in FIG. 12. Referring to FIG. 12, computing device 1102 may include processor 1202, display 1204, input device 1206, and memory 1208, which may be interconnected. In a preferred embodiment, memory 1208 contains a storage device for storing a computer program for controlling processor 1202.

Processor 1202 uses the computer program to present on display 1204 the media guidance application and the data received through communications link 1104 and commands and values transmitted by a user of computing device 1102. It should also be noted that data received through communications link 1104 or any other communications links may be received from any suitable source. Input device 1206 may be a computer keyboard, a mouse, a trackball, a keypad, a touch-pad, a cursor-controller, a dial, a switchbank, a lever, a remote control, or any other suitable input device as would be used by a designer of input systems or process control systems. Alternatively, input device 1206 may be a finger or stylus used on a touch screen display 1204.

Server 1110 may include processor 1220, display 1222, input device 1224, and memory 1226, which may be interconnected. In a preferred embodiment, memory 1226 contains a storage device for storing data received through communications link 1108 or through other links, and also receives commands and values transmitted by one or more users. The storage device further contains a server program for controlling processor 1220.

In some embodiments, the application may include an application program interface (not shown), or alternatively, the application may be resident in the memory of computing device 1102 or server 1110. In another suitable embodiment, the only distribution to computing device 1102 may be a graphical user interface ("GUI") which allows a user to interact with the application resident at, for example, server 1110.

In one particular embodiment, the application may include client-side software, hardware, or both. For example, the application may encompass one or more Web-pages or Web-page portions (e.g., via any suitable encoding, such as Hyper-Text Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

Accordingly, methods, systems, and media for providing media guidance with media content from alternate sources are provided.

Although the disclosed subject matter has been described and illustrated in the foregoing illustrative embodiments, it is understood that the present disclosure has been made only by way of example, and that numerous changes in the details of implementation of the disclosed subject matter can be made without departing from the spirit and scope of the disclosed subject matter. Features of the disclosed embodiments can be combined and rearranged in various ways.

What is claimed is:

1. A method for providing media guidance with a plurality of media sources, the method comprising:
receiving, using a hardware processor, a plurality of media content listings for presenting to a user that are each associated with one of a plurality of television content sources;
determining, without user intervention, for a media content listing of the plurality of media content listings, an availability of a media content item corresponding to the media content listing from one or more alternate sources of media content, wherein each of the one or more alternate sources is different than the plurality of television content sources;
causing the plurality of media content listings to be presented to the user;
concurrently with causing the plurality of media content listings to be presented, causing an alternate source indicator to be presented to the user within the media content listing in response to determining that the corresponding media content item is available from the one or more alternate sources of media content; and
causing the corresponding media content item to be presented in response to receiving a selection of the alternate source indicator.

2. The method of claim 1, wherein the television content source is a broadcast television source and the one or more alternate sources is an over-the-top content source.

3. The method of claim 1, wherein the plurality of media content listings is presented to the user as a program listings grid having one or more rows of media content listings.

4. The method of claim 1, wherein the plurality of media content listings is presented to the user as a list of search results responsive to a search query from the user.

5. The method of claim 1, further comprising:
accessing a priority list having at least a first alternate source and a second alternate source;
determining whether the media content item is available from the first alternate source;

determining whether the media content item is available from the second alternate source in response to determining that the media content item is unavailable from the first alternate source; and causing the alternate source indicator to be presented in response to determining that the media content item is available from the second alternate source, wherein the second alternate source is associated with the media content item.

6. The method of claim 5, further comprising inhibiting additional alternate sources from being searched for the media content item in response to determining that the media content item is available from the second alternate source.

7. The method of claim 1, further comprising:
storing login information associated with the one or more alternate sources; and
retrieving, without user intervention, the corresponding media content item from an available alternate source using the stored login information.

8. A system for providing media guidance with a plurality of media sources, the system comprising:
a hardware processor that is configured to:
receive a plurality of media content listings for presenting to a user that are each associated with one of a plurality of television content sources;
determine, without user intervention, for a media content listing of the plurality of media content listings, an availability of a media content item corresponding to the media content listing from one or more alternate sources of media content, wherein each of the one or more alternate sources is different than the plurality of television content sources;
cause the plurality of media content listings to be presented to the user;
concurrently with causing the plurality of media content listings to be presented, cause an alternate source indicator to be presented to the user within the media content listing in response to determining that the corresponding media content item is available from the one or more alternate sources of media content; and
cause the corresponding media content item to be presented in response to receiving a selection of the alternate source indicator.

9. The system of claim 8, wherein the television content source is a broadcast television source and the one or more alternate sources is an over-the-top content source.

10. The system of claim 8, wherein the plurality of media content listings is presented to the user as a program listings grid having one or more rows of media content listings.

11. The system of claim 8, wherein the plurality of media content listings is presented to the user as a list of search results responsive to a search query from the user.

12. The system of claim 8, wherein the hardware processor is further configured to:
access a priority list having at least a first alternate source and a second alternate source;
determine whether the media content item is available from the first alternate source;
determine whether the media content item is available from the second alternate source in response to determining that the media content item is unavailable from the first alternate source; and
cause the alternate source indicator to be presented in response to determining that the media content item is available from the second alternate source, wherein the second alternate source is associated with the media content item.

13. The system of claim 12, wherein the hardware processor is further configured to inhibit additional alternate sources from being searched for the media content item in response to determining that the media content item is available from the second alternate source.

14. The system of claim 8, wherein the hardware processor is further configured to:
store login information associated with the one or more alternate sources; and
retrieve, without user intervention, the corresponding media content item from an available alternate source using the stored login information.

15. A non-transitory computer-readable medium containing computer-executable instructions that, when executed by a processor, cause the process to perform a method for providing media guidance with a plurality of media sources, the method comprising:
receiving a plurality of media content listings for presenting to a user that are each associated with one of a plurality of television content sources;
determining, without user intervention, for a media content listing of the plurality of media content listings, an availability of a media content item corresponding to the media content listing from one or more alternate sources of media content, wherein each of the one or more alternate sources is different than the plurality of television content sources;
causing the plurality of media content listings to be presented to the user;
concurrently with causing the plurality of media content listings to be presented, causing an alternate source indicator to be presented to the user within the media content listing in response to determining that the corresponding media content item is available from the one or more alternate sources of media content; and
causing the corresponding media content item to be presented in response to receiving a selection of the alternate source indicator.

16. The computer-readable medium of claim 15, wherein the television content source is a broadcast television source and the one or more alternate sources is an over-the-top content source.

17. The computer-readable medium of claim 15, wherein the plurality of media content listings is presented to the user as a program listings grid having one or more rows of media content listings.

18. The computer-readable medium of claim 15, wherein the plurality of media content listings is presented to the user as a list of search results responsive to a search query from the user.

19. The computer-readable medium of claim 15, wherein the method further comprises:
accessing a priority list having at least a first alternate source and a second alternate source;
determining whether the media content item is available from the first alternate source;
determining whether the media content item is available from the second alternate source in response to determining that the media content item is unavailable from the first alternate source; and
causing the alternate source indicator to be presented in response to determining that the media content item is available from the second alternate source, wherein the second alternate source is associated with the media content item.

20. The computer-readable medium of claim 19, wherein the method further comprises inhibiting additional alternate sources from being searched for the media content item in response to determining that the media content item is available from the second alternate source.

21. The computer-readable medium of claim 15, wherein the method further comprises:
   storing login information associated with the one or more alternate sources; and
   retrieving, without user intervention, the corresponding media content item from an available alternate source using the stored login information.

* * * * *